US010100894B2

(12) United States Patent
Dreher et al.

(10) Patent No.: US 10,100,894 B2
(45) Date of Patent: Oct. 16, 2018

(54) EXTENSION FOR A SHOCK ABSORBER

(71) Applicant: ZF Friedrichshafen AG, Friedrichshafen (DE)

(72) Inventors: Robert Dreher, Schweinfurt (DE); Sebastian Ramer, Bamberg (DE); Ralf Kemmer, Michelau (DE); Krzysztof Zielecki, Schweinfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 15/265,332

(22) Filed: Sep. 14, 2016

(65) Prior Publication Data
US 2017/0074343 A1 Mar. 16, 2017

(30) Foreign Application Priority Data
Sep. 16, 2015 (DE) .................. 10 2015 217 750

(51) Int. Cl.
*F16F 9/32* (2006.01)
*F16F 9/18* (2006.01)

(52) U.S. Cl.
CPC ............ *F16F 9/3235* (2013.01); *F16F 9/185* (2013.01); *F16F 9/3257* (2013.01); *F16F 2226/00* (2013.01)

(58) Field of Classification Search
CPC ....... F16F 9/3242; F16F 9/3257; F16F 9/3235
See application file for complete search history.

(56) References Cited

U.S. PATENT DOCUMENTS

| 2,315,415 | A | * | 3/1943 | Gilbert | A01J 9/02 210/244 |
| 2,488,215 | A | * | 11/1949 | Mayne | A47J 37/101 126/383.1 |
| 5,148,947 | A | * | 9/1992 | Epp | B05C 11/1042 220/4.03 |
| 5,518,225 | A | * | 5/1996 | Gubitz | B60G 15/12 267/64.24 |
| 5,636,831 | A | * | 6/1997 | Gubitz | F16F 9/05 267/220 |
| 5,769,401 | A | * | 6/1998 | Pradel | B60G 15/12 206/335 |
| 5,950,996 | A | * | 9/1999 | Pradel | B60G 15/061 267/221 |
| 6,227,527 | B1 | * | 5/2001 | Berg | B60G 15/14 267/218 |
| 6,357,564 | B1 | * | 3/2002 | Tantius | B60G 15/063 188/266.5 |
| 6,454,248 | B2 | * | 9/2002 | Pradel | B60G 17/044 267/64.11 |
| 6,511,057 | B1 | * | 1/2003 | Berg | B60G 11/28 267/64.21 |
| 2001/0013451 | A1 | * | 8/2001 | Grundei | B60G 15/06 188/316 |

(Continued)

FOREIGN PATENT DOCUMENTS

DE 10 2006 016 701 10/2007

*Primary Examiner* — Thomas J Williams
*Assistant Examiner* — James K Hsiao
(74) *Attorney, Agent, or Firm* — Cozen O'Connor

(57) ABSTRACT

Extension for a cylinder of a vibration damper comprising a base and a tube portion adjoining the latter. The base and the tube portion are formed in one piece. The tube portion has a circumferential bend pleat with respect to the base.

19 Claims, 2 Drawing Sheets

(56) References Cited

U.S. PATENT DOCUMENTS

2015/0191068 A1* 7/2015 Kantor ................... B60G 11/27
                                                                280/6.157
2016/0363184 A1* 12/2016 Noguchi ................. F16F 9/062

* cited by examiner

EXTENSION FOR A SHOCK ABSORBER

BACKGROUND OF THE INVENTION

1. Field of the Invention

The invention is directed to an extension for a vibration damper (shock absorber) and a method for producing it.

2. Description of the Related Art

In many vehicles, there is the problem that the available axial installation space in the chassis is very tight. However, the opposite situation also exists, particularly in larger vehicles. DE 10 2006 016 701 A1 describes solutions for minimizing particularly the damping medium requirement or piston rod length. Disclosed is a cylinder which is optimized with respect to the maximum compression path is used in combination with an extension shaft. A connection member is fastened to this extension shaft. In DE 10 2006 016 701 A1, the extension shaft and a base of the cylinder are constructed in one part as a forging, and the extension shaft is formed by pipe. However, there is no indication of how the tubular extension shaft is connected to the base.

SUMMARY OF THE INVENTION

It is an object of the present invention to realize an extension that can be produced simply and inexpensively.

According to one aspect of the present invention, the tube portion has a circumferential bend pleat with respect to the base.

The bend pleat provides an axial distance of the base with respect to an end-side end face of the extension shaft and provides for an appreciable strengthening of the entire structural component part. Compared with a weld construction between the tubular body and the base, a tightness inspection can be dispensed with.

In a further advantageous development, the bend pleat has a minimum bend angle of 180°. Accordingly, in a longitudinal portion between the end-side end face and the base, the tubular body is double-layered and therefore correspondingly dimensionally stable and stable with respect to welding.

In a preferred embodiment form, an inner portion of the bend pleat and an inner side of the tube portion touch one another.

In order to carry out surface sealing with as little additional material as possible, the tube portion has at least one run-off opening at a lowest position on the base side. Excess paint, for example, can exit the tube portion via the run-off opening.

To minimize the total weight of the cylinder, the tube portion has a greater wall thickness than the cylinder. Both structural component parts can be exactly configured to their loads and can be constructed optimally through separate fabrication.

According to an advantageous aspect, the outer diameter is greater in the region of a bend pleat portion than in the rest of the tube portion. Accordingly, a defined longitudinal portion can be formed which, for example, engages in a fit with the cylinder or allows better access for insertion of a welding tool.

The base is preferably shaped convexly in direction of the tube portion. This constructional shape stiffens the base and offers a reliable self-centering supporting surface, e.g., for a base valve arranged in the cylinder.

The method for producing the extension includes the following steps:
producing a round blank;
deep-drawing a tubular body with an end-side base; and
folding back the base into the tubular body with a bend pleat between the base and a tube portion.

One advantage is that a dimensionally stable connection, which is tight against pressurized medium, is achieved between the base and the tubular body. In addition, a tubular body is very rigid in proportion to its own weight. Chip-removing post-machining is not necessary, i.e., the structural component part is finished when it leaves the shaping device.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be described more fully with reference to the following description of the drawings. In the drawings.

DETAILED DESCRIPTION OF THE PRESENTLY PREFERRED EMBODIMENTS

Figure 1:
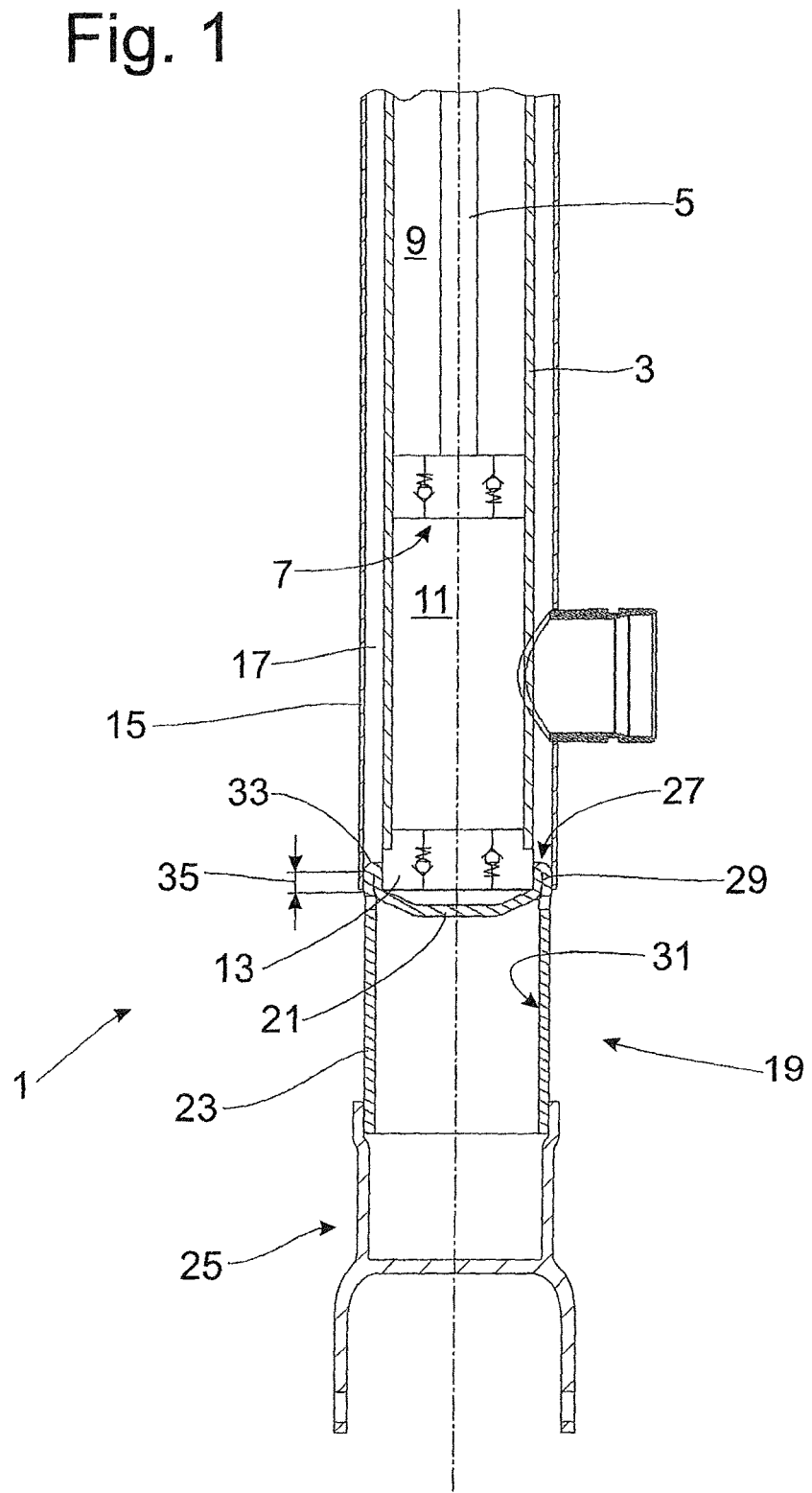
FIG. 1 is a sectional view through a vibration damper.

FIG. 1 shows a vibration damper 1 with an inner cylinder 3 in which a piston rod 5 together with a piston 7 outfitted with a valve executes an axial displacing movement. The piston 7 divides the cylinder 3 into a working chamber 9 proximal to the piston rod and a working chamber 11 distal to the piston rod, both of which working chambers 9; 11 are completely filled with damping medium.

The inner cylinder 3 is bounded at the end side by a base valve body 13 on which the inner cylinder 3 is axially supported and radially centered. An outer cylinder 15 envelopes the inner cylinder 3. An annular space between the inner cylinder 3 and outer cylinder 15 forms a compensation space 17 for the damping medium volume displaced by the piston rod 5, this compensation space 17 being only partially filled with damping medium.

Following the outer cylinder 15 in axial direction is a extension 19 that has a base 21 for the outer cylinder 15 and a tube portion 23 to a connection member 25, in this case a fork, mounted at the end side. The base 21 and the tube portion 23 are constructed to form one piece and are connected to one another via a circumferential bend pleat 27.

As can also be seen from the illustrations, the wall thickness of the tube portion 23 is greater than that of the outer cylinder 15. The tube portion 23 of the extension 19 is subjected to higher loading than the outer cylinder 15 so that a specific configuration of the wall thickness of the two structural component parts is made possible by the separate construction.

The bend pleat 27 has a minimum bend angle of 180°. In this specific embodiment example, an inner side of the bend pleat 27 (the folded over portion) and an inner side of the tube portion 23 touch one another. Accordingly, there is provided an especially stiff circumferential edge formed by the bend pleat 27 that extends from an end-side end face 33 of the extension 19 to the outer edge of the base 21. The base 21 itself is convexly shaped in direction of the tube portion 23 and, for example, can also have a smaller wall thickness than the tube portion 23.

As can also be seen from FIG. 1, the outer diameter of the extension 19 is greater in the region of a bend pleat portion 35 than in the tube portion 23. Accordingly, an end-side end face 37 of the outer cylinder 15 is easily accessible for a welding tool.

In the process of fabricating the vibration damper 1 as a whole, the extension 19 is added corresponding to a conventional base for the outer cylinder 15. The connection to the connection member 25 can also be carried out first during vehicle assembly, e.g., by gluing or an interference fit.

Figure 2:
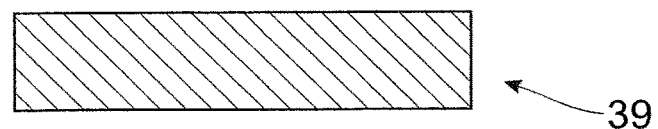
FIGS. 2-4 are the production sequence for producing the extension.
Figure 3:
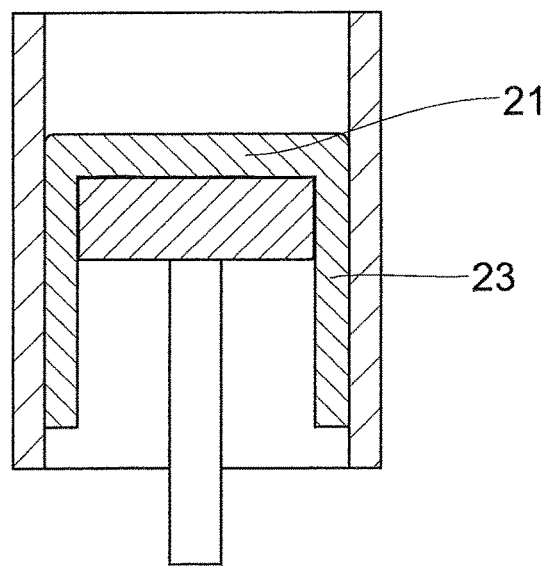
Figure 4:
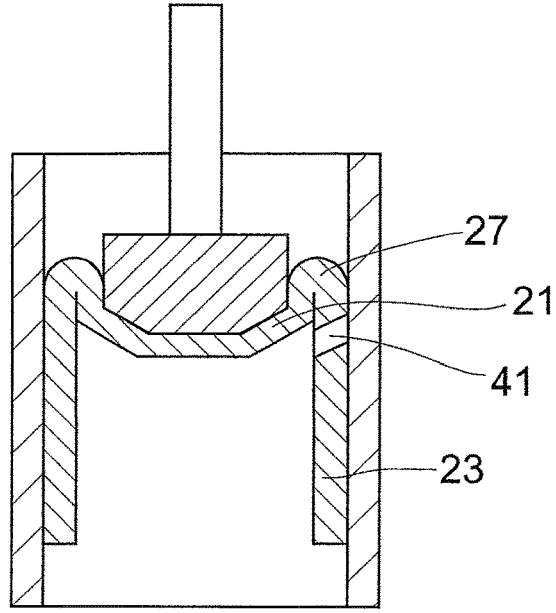

FIGS. 2 to 4 schematically show the production method. In a first step, a round blank 39 is produced, its volume corresponding to the volume of the extension 1 and to a machining allowance. Subsequently, a pot shape, i.e., a tube portion 23 with the end-side base 21, is produced in a first shaping step.

In a further step, the base 21 is folded back into the tube portion 23 resulting in the circumferential bend pleat 27. At the lowest position on the base side, the tube portion 23 has at least one run-off opening 41 which is introduced before or after folding back into the extension 19.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An extension for a cylinder of a vibration damper comprising:
    a laterally extending base extending radially to a circumferential bend pleat; and
    a tube portion adjoining the base, the tube portion has the circumferential bend pleat at a first end with respect to the base,
    wherein the base and the tube portion are formed in one piece,
    wherein the tube portion extends longitudinally from a first side of the base and the bend pleat extends longitudinally from a second side of the base opposite the first side of the base.

2. The extension according to claim 1, wherein the circumferential bend pleat has a minimum bend angle of 180°.

3. The extension according to claim 2, wherein an inner side of the circumferential bend pleat and an inner side of the tube portion touch one another.

4. The extension according to claim 1, wherein the tube portion has at least one run-off opening at a lowest position with respect to a base side.

5. The extension according to claim 1, wherein the tube portion has a greater wall thickness than the cylinder.

6. The extension according to claim 1, wherein an outer diameter in a region of a bend pleat portion is greater than an outer diameter in a remainder of the tube portion.

7. The extension according to claim 1, wherein the base is shaped convexly in direction of the tube portion.

8. A method for producing an extension comprising:
    producing a round blank;
    deep-drawing a tubular body with an end-side base;
    folding back the base into the tubular body with a bend pleat between the base and a tube portion such that the bent plead defines the radial extent of the base; wherein the tube portion extends longitudinally from a first side of the base, and the bend pleat extends longitudinally from a second side of the base opposite the first side of the base.

9. The method according to claim 8, further comprising: forming at least one run-off opening in the tube portion.

10. The method according to claim 9, wherein the at least one run-off opening is formed at a lowest position with respect to a base side.

11. The method according to claim 8, wherein the bend pleat is a circumferential bend pleat having a minimum bend angle of 180°.

12. The method according to claim 8, wherein an outer diameter in a region of a bend pleat portion is greater than an outer diameter in a remainder of the tube portion.

13. The extension according to claim 1, wherein the extension is pot-shaped.

14. The extension according to claim 1, wherein the laterally extending base is configured to be fixedly connected to the cylinder.

15. The extension according to claim 14, wherein a tube portion is configured to be fixedly connected to a connection element at a second end opposite the first end.

16. The method according to claim 8, wherein the end-side base configured to be fixedly connected to a cylinder of a vibration damper to longitudinally extend the cylinder.

17. The method according to claim 8, wherein the tube portion is configured to be fixedly connected to a connection element at an end opposite the base.

18. The method according to claim 8, wherein the extension is pot-shaped.

19. A vibration damper assembly comprising:
    a cylinder of a vibration damper;
    a connection element;
    an extension comprising:
        a laterally extending base configured to be fixedly connected to the cylinder, the base extending radially to a circumferential bend pleat; and
        a tube portion adjoining the base, the tube portion having the circumferential bend pleat at a first end with respect to the base and the tube portion is fixedly connected to the connection element at a second end opposite the first end,
    wherein the base and the tube portion are formed in one piece,
    wherein the tube portion extends longitudinally from a first side of the base and the bend pleat extends longitudinally from a second side of the base opposite the first side of the base.

* * * * *